United States Patent [19]
Iwai et al.

[11] Patent Number: 5,895,177
[45] Date of Patent: Apr. 20, 1999

[54] MACHINE TOOL WITH FAULT DETECTION

[75] Inventors: Masayuki Iwai, Nagoya; Katsunori Tsutsui, Chita-gun, both of Japan

[73] Assignee: Brother Kogyo Kabushiki Kaisha, Aichi-ken, Japan

[21] Appl. No.: 08/859,166

[22] Filed: May 20, 1997

[30] Foreign Application Priority Data

May 20, 1996 [JP] Japan .................. 8-125008

[51] Int. Cl.⁶ .................................... B23B 35/00
[52] U.S. Cl. .................. 408/1 R; 318/35; 364/474.19; 408/5; 408/9
[58] Field of Search .................. 408/1 R, 5, 6, 408/11, 9, 10; 318/35, 568.16, 568.24; 364/474.21, 474.19

[56] References Cited

U.S. PATENT DOCUMENTS

| | | | |
|---|---|---|---|
| 3,545,310 | 12/1970 | Porath et al. | 408/11 |
| 4,351,029 | 9/1982 | Maxey et al. | 408/11 |
| 4,478,538 | 10/1984 | Kakino | 408/11 |
| 4,550,277 | 10/1985 | Carney | 364/474.19 |
| 4,656,868 | 4/1987 | Azuma et al. | 408/11 |
| 5,155,473 | 10/1992 | Oketani et al. | 408/6 |
| 5,414,632 | 5/1995 | Mochizuki et al. | 364/474.19 |

*Primary Examiner*—Daniel W. Howell
*Assistant Examiner*—Adesh Bhargava
*Attorney, Agent, or Firm*—Kane, Dalsimer, Sullivan, Kurucz, Levy, Eisele and Richard, LLP

[57] ABSTRACT

A machine tool includes a spindle having a cutting tool for cutting a workpiece. For fault detection, a control unit of the machine tool detects a value representing a torque applied on the spindle while the spindle is stopped in a state the cutting tool is engaged with the workpiece. The control unit further compares the detected value (representing a torque) with a predetermined threshold thereby to determine that a fault has occurs. Since the detection of the value representing a torque is performed while the spindle is stopped, the detection is free from the effects of acceleration or deceleration of the spindle.

22 Claims, 5 Drawing Sheets

MACHINE TOOL WITH FAULT DETECTION

BACKGROUND OF THE INVENTION

The present invention relates to a machine tool such as threading machine.

There is a type of a machine tool provided with a rotatable spindle having a cutting tool for cutting a workpiece.

Generally, the quality of the machining operation is affected by the occurrence of various faults, such as, cutting chips being caught between the workpiece and the cutting tool or a worn-out cutting tool.

It is known that, if a fault occurs while the machining tool is cutting the workpiece, a torque required to rotate the spindle is increased. Therefore, a conventional machine tool is arranged to detect a torque applied on the spindle while the spindle is rotating, thereby to determine that a fault has occurred.

Since the torque applied on the cutting tool may be affected by the acceleration and the deceleration of the spindle, it is necessary to detect the torque while the spindle rotates at a constant speed.

However, in some cases, such as in threading a short thread, the time interval while the spindle rotates at a constant speed may be relatively short. In such short time interval, the torque cannot be detected accurately.

SUMMARY OF THE INVENTION

It is therefore an object of the present invention to provide an improved machine tool capable of accurately detecting faults without being affected by the acceleration and the deceleration of a spindle.

According to one aspect of the invention, there is provided a machine tool including a cutting tool, a spindle which holds the cutting tool, a drive unit arranged to drive the spindle so that the cutting tool cuts a workpiece and to drive the spindle in a reverse direction so that the cutting tool retracts from the workpiece; and a control unit arranged to detect a value representing a torque applied on the spindle and to compare the value with a predetermined threshold thereby to determine if a fault has occurred.

The control unit detects the value when the drive unit stops the spindle in a state that the cutting tool is acting on the workpiece with applying the torque on the spindle to keep the engagement of the cutting tool with the workpiece.

The occurrence of a fault increases the torque required for cutting the workpiece. In order to stop the spindle with keeping the engagement of the cutting tool with the workpiece, it is necessary to apply the torque corresponding to the torque required for cutting the workpiece. Accordingly, it is possible to detect the torque for cutting the workpiece by detecting the above-mentioned value when the drive unit stops the spindle with applying the torque on the spindle to keep the engagement of the cutting tool with the workpiece. Thus, it is possible to determine if a fault has occurred based on the detection of the above-mentioned value. Further, since detection of the above-mentioned value is performed when the spindle is stopped, the value is free from the effects of acceleration or deceleration. Thus, a fault can be detected accurately, even in the case where the machine tool performs a machining operation in which the time interval while the spindle rotates at constant speed is very short.

In a particular arrangement, the drive unit rotates and feeds the spindle respectively in a first rotational direction and a first feeding direction, thereby to cut the workpiece by the cutting tool. The drive unit rotates and feeds the spindle respectively in a second rotational direction and a second feeding direction, thereby to retract cutting tool from the workpiece. As constructed above, it is possible to apply the machine tool of the present invention can be applied to the threading machine.

Further, the drive unit includes a rotation motor driven to rotate the spindle and a feeding motor driven to feed the spindle. In this case, it is preferable that the value (representing the torque applied on the spindle) is a value of a drive current sent from the controller to the rotation motor. In particular, the rotation motor may be a servo-motor and the value (representing the torque applied on the spindle) may be a drive current from a servo-amplifier to the servo-motor.

In a preferred embodiment, if the control unit detects the occurrence of a fault, the control unit controls the drive unit to rotate and feed the spindle respectively in the second rotational direction and the second feeding direction at lower speeds. With such an arrangement, the workpiece is protected from being damaged by slowly retracting the cutting tool therefrom.

In another preferred embodiment, the control unit is arranged to classify faults according to the detected value. Further, the control unit is arranged to select a retracting speed of the cutting tool, based on the classification of the fault. With this, if the control unit finds that the fault does not damage the workpiece, the retracting speed can be fast. Thus, the manufacturing speed can be improved.

Conveniently, faults are classified into a plurality of classes including a first-class and a second-class. The first-class-fault is set such that the occurrence of the first-class-fault increases the torque. The second-class-fault is set such that the occurrence of the second-class-fault decreases the torque. Further, the control unit has a plurality of thresholds including a first threshold and a second threshold respectively used to discriminate the first-class-fault and the second-class-fault from a state in which no fault occurs.

Optionally, the first-class-fault is further classified based on the value (representing a torque) into at least two classes. The control unit has at least one additional threshold used to discriminate at least two classes of the first-class-fault. With such an arrangement, if the fault is not severe, the retracting speed can be faster than that in case where a severe fault is found. Thus, the manufacturing speed can be improved.

According to another aspect of the present invention, a method of fault detection of the present invention is performed during the machining process. The method includes the steps of (1) rotating a spindle (having a cutting tool thereon) with a torque required to resist a reactive force from s workpiece, so that the cutting tool cuts the workpiece. (2) stopping the cutting tool in a state that the cutting tool is engaged with the workpiece, while keeping applying the torque on the spindle. (3) reading a value representing the torque applied on the cutting tool. (4) comparing the value with at least one predetermined threshold and (5) determining if a fault has occurred based on a result of the comparing step.

In a particular arrangement, the method further includes the step of retracting the cutting tool from the workpiece after the comparing step. In one case, the retracting step is performed at a lower speed, if the control unit detects the occurrence of a fault.

DESCRIPTION OF THE PREFERRED EMBODIMENT

Figure 1:
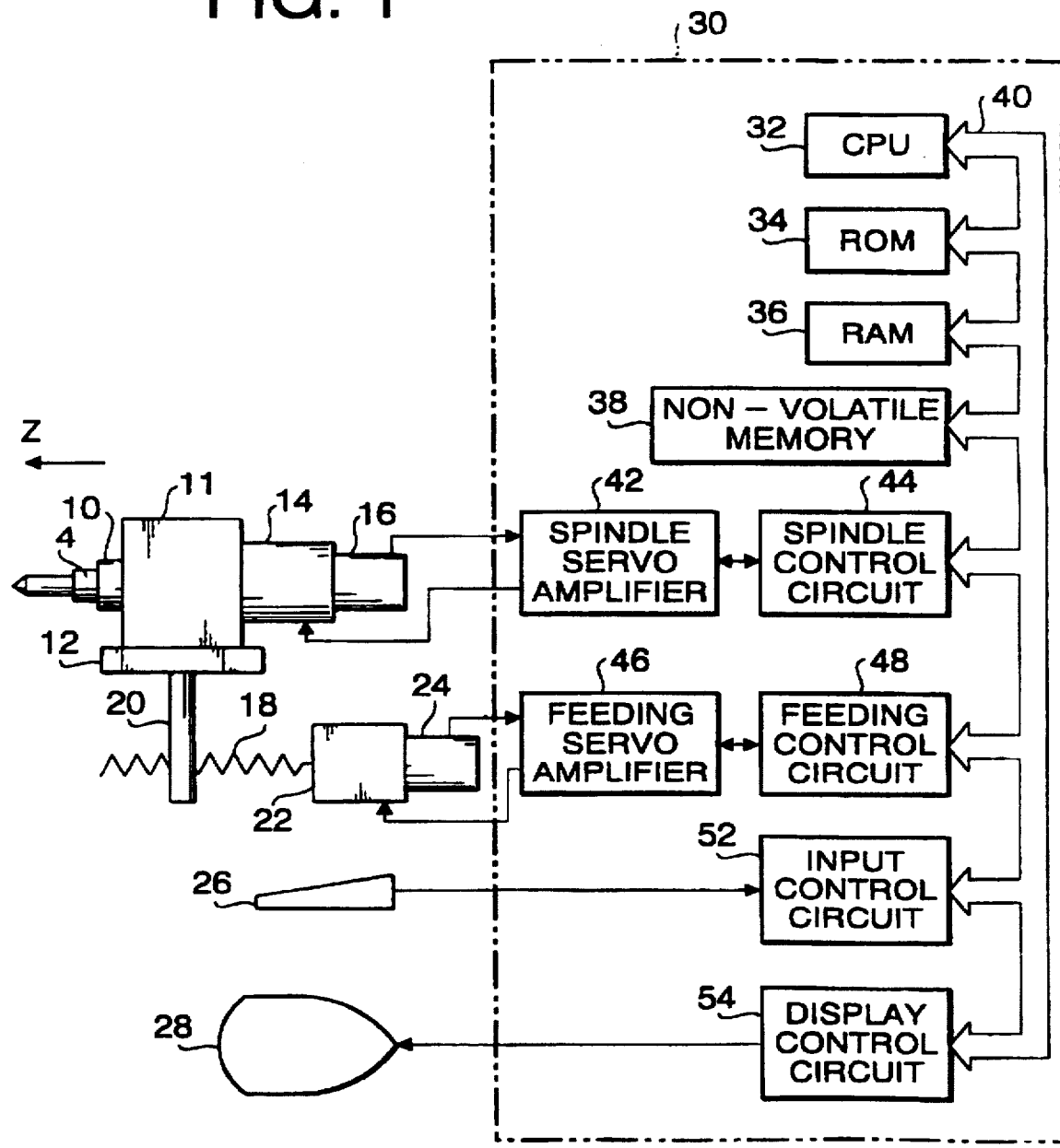
FIG. 1 is a schematic view of a machine tool according to an embodiment of the invention.

An embodiment of the present invention is described with reference to the accompanying drawings. FIG. 1 shows a threading machine 1 according to the embodiment of the present invention.

Figure 2:
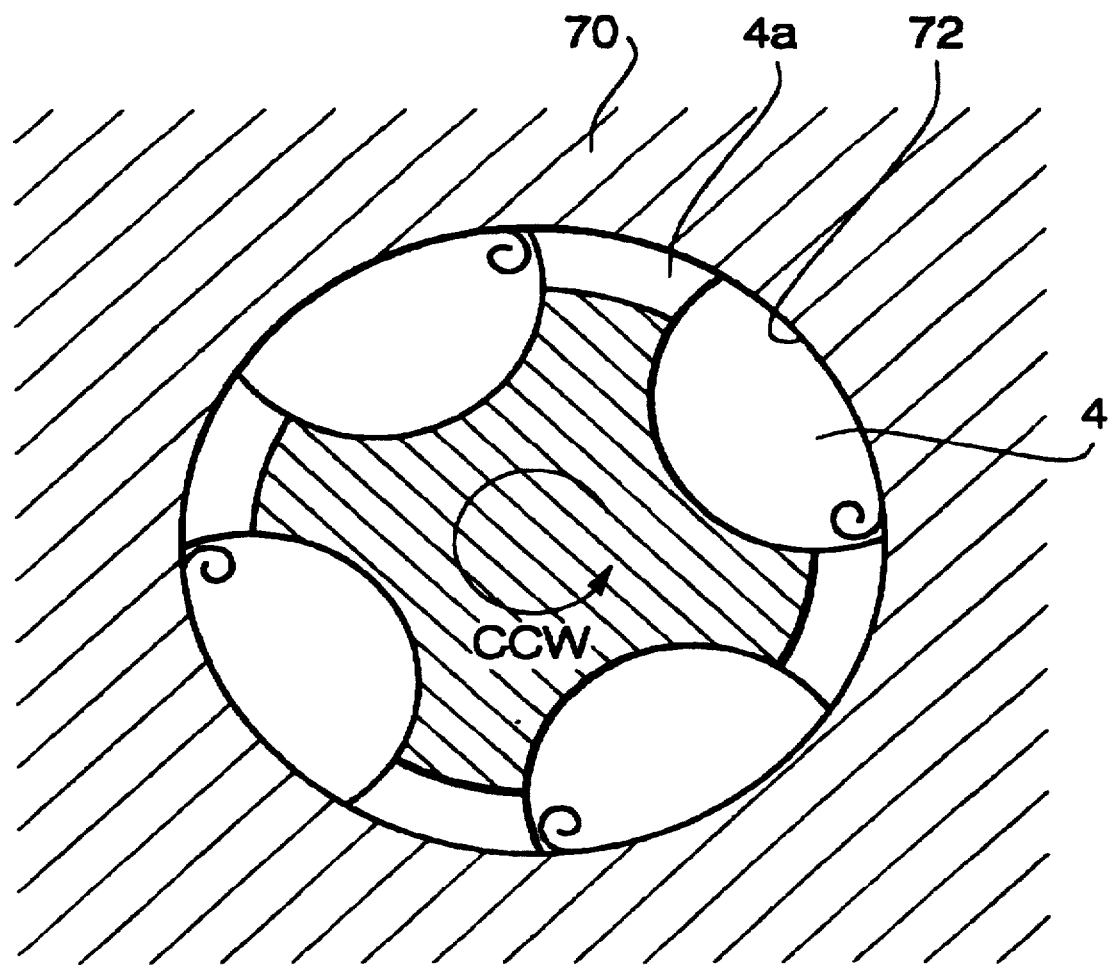
FIG. 2 is a schematic cross section of a cutting tool of the machine tool of FIG. 1.

The threading machine 1 is provided with a drill tap 4 for cutting an internal thread in a workpiece 70 (step Shown in FIG. 2). The drill tap 4 is provided on a spindle 10 that is rotatably supported by a support 11 mounted on a movable carriage 12. The carriage 12 is movably supported by a not-shown machine body. A spindle motor 14 is mounted to the support 11 to rotate the spindle 10. A spindle encoder 16 is provided to the spindle motor 14, for detecting the rotation of the spindle 10.

The carriage 12 is driven in the axial direction of the spindle 10 (Z-direction) by a ball screw mechanism 1b. The ball screw mechanism 1b includes a ball screw 18 extending in the Z-direction, a nut 20 fixed to the carriage 12 and engaging the ball screw 18, and a feeding motor 22 for rotating the ball screw 18. The rotation of the ball screw 18 is detected by a feed encoder 24.

The spindle motor 14, the feeding motor 22, the spindle encoder 16 and the feed encoder 24 are connected to a control unit 30. The control unit 30 includes a CPU 32, a ROM 34, a RAM 36 and a non-volatile memory 38, each connected to a bus 40.

The control unit 30 further includes a spindle servo-amplifier 42 and a spindle control circuit 44. The spindle servo-amplifier 42 receives a pulse signal from the spindle encoder 16 and supplies a drive current to the spindle motor 14 based on an instruction from the spindle control circuit 44. The control unit 30 also includes a feeding servo-amplifier 46 and a feeding control circuit 48. The feeding servo-amplifier 46 receives a pulse signal from the feed encoder 24 and supplies a drive current to the feed motor 22. The spindle control circuit 42 and the feeding control circuit 44 are connected to the bus 40.

The threading machine 1 further includes a keyboard 26, connected to the bus 40 via an input control circuit 52, and a CRT display 28, connected to the bus 40 via a display control circuit 54. The threading machine 1 is arranged to control the spindle motor 14 and the feeding motor 22 according to various settings that may be entered using the keyboard 26.

Figure 3A:
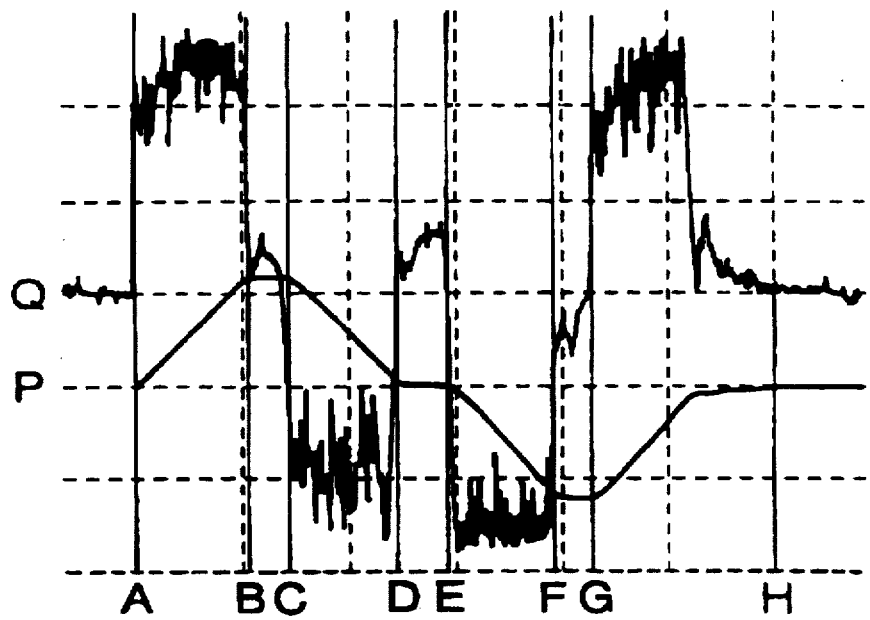
FIGS. 3A and 3B are graphs showing torque and spindle rotation speed for normal and fault states, respectively.
Figure 3B:
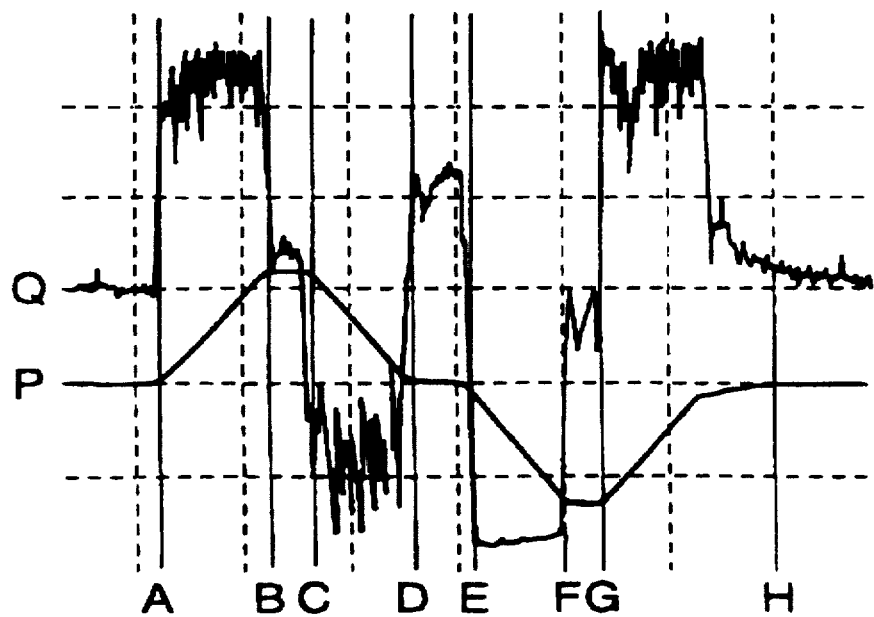

Fault detection during a threading operation is now described with reference to FIGS. 2, 3A, and 3B. FIG. 2 is a schematic view showing the drill tap 4 and the workpiece 70. FIGS. 3A and 3B are graphs showing torque and spindle rotation speed for normal and fault states, respectively.

In the threading machine 1, a threading operation includes (a) a forward operation in which the control unit 30 rotates the spindle 10 counter-clockwise (CCW) in FIG. 2 and feeds the spindle 10 in a forward direction (i.e., in the positive Z-direction in FIG. 1) so that the drill tap 4 cuts into the workpiece 70, (b) a stop operation in which the control unit 30 stops the rotation and the feeding of the spindle 10, and (c) a retraction operation in which the control unit 30 rotates the spindle 10 clockwise (CW) in FIG. 2 and feeds the spindle 10 in a reverse direction (i.e., in the negative Z-direction) to retract the spindle 10 from the workpiece 70.

When the drill tap 4 is rotated CCW to cut into an internal wall of a hole 72 in the workpiece 70, a reactive force is applied to the drill tap 4 in a CW direction. Thus, a torque must be applied to the spindle 10 (and thus to the drill tap 4) to overcome the reactive force while the drill tap 4 is cutting into the internal wall of the hole 72 (that is, during the forward operation and the stop operation).

The torque applied on the spindle 10 is shown in FIGS. 3A and 3B for normal operation and fault-state operation, respectively. In FIGS. 3A and 3B, a line Q indicates torque and a line P indicates rotation speed of the spindle 10.

The forward operation is performed from point A to point D in FIGS. 3A and 3B. At point A, the drill tap 4 is almost in contact with the workpiece 70. When the threading operation is started (that is, when the drill tap 4 starts cutting the workpiece 70), the rotation of the spindle 10 is accelerated (point A to point B in FIGS. 3A and 3B), is constant (point B to point C), and is decelerated (point C to point D) to stop. The feeding speed of the spindle 10 is changed according to the rotation speed.

In the period between points D and E, the drill tap 4 is in a stopped state but the drill tap 4 has cut into the workpiece 70 as shown in FIG. 2.

A retracting operation is performed from point E to point G in FIGS. 3A and 3B. The rotation of the spindle 10 is accelerated (point E to point F), is a constant speed (point F to point G), and then is decelerated (point G to point H) to stop. At point H, the drill tap 4 is just outside the hole 72 of workpiece 70 (FIG. 2).

As shown in FIG. 3B, in case where a fault has occurred, the torque Q is generally larger than the torque Q for normal operation (FIG. 3A). However, in the periods between points A and B and points E and F, the torque is affected by the acceleration of the spindle 10 such that the torque cannot be detected accurately. Similarly, in the periods between points C and D and points G and H, the torque is affected by the deceleration of the spindle 10. Further, the period between points B and C and points F and G, in which the spindle 10 is rotated at a constant speed is generally very short such that the torque cannot be detected accurately.

Accordingly, in this embodiment, the control unit 30 uses a torque Q when the spindle is stopped (i.e., between points D and E) for fault detection.

Figure 4:
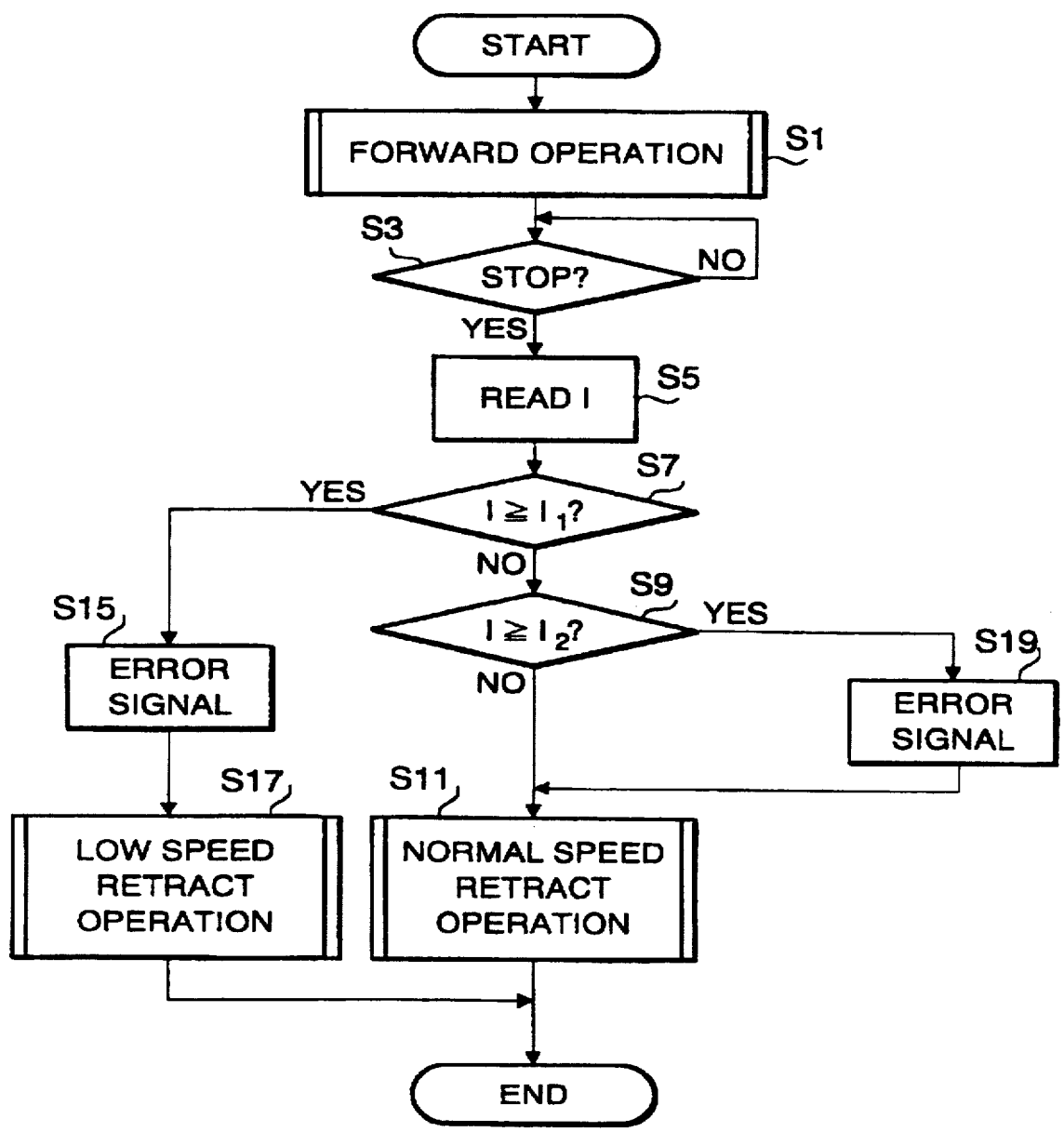
FIG. 4 is a flow chart showing a control process for the machine tool of FIG. 1.

FIG. 4 is a flow chart showing a control process for the threading machine 1. In this control process, faults are classified into a first-class-fault and a second-class-fault. The first-class-fault is cutting chips being caught between the workpiece 70 and wear of the drill tap 4. If such first-class-fault occurs, the torque may be increased and it is necessary to slowly retract the drill tap 4 to prevent the damage on the workpiece 70. The second-class-fault includes a drill tap 4 being broken and partially missing. If such second-class-fault occurs, the torque may be decreased and it is not necessary to slowly retract the drill tap 4.

Therefore, the control unit 30 compares the drive current value I (representing a torque) with two thresholds I1 and I2 and determines that the first-class-fault occurs (I≧I1), the second-class-fault (I≦I2) occurs or no fault occurs (I2<I<I1).

When the threading operation is started, the control unit 30 performs the forward operation (step S1), that is, the control unit 30 drives the spindle motor 14 to rotate the spindle 10 CCW (FIG. 2) and drives the feeding motor 22 to feed the carriage 12 forward (i.e., in the positive Z-direction in FIG. 1) to cut into the workpiece 70 and then stop at a predetermined point. The rotational speed and the feeding speed are controlled according to a program inputted from the keyboard 26 and stored in the RAM memory 36 or in the non-volatile memory 38.

When the forward operation is completed, the control unit 30 checks if the spindle 10 has stopped based on the output from the spindle encoder 16 or the feed encoder) 24 (step S3). If the control 30 detects that the spindle 10 is stopped (YES at step S3), the control unit 30 retrieves a drive current value I sent to the spindle motor 14 from the servo-amplifier 42 (step S5). The drive current value I retrieved represents the torque for the period while the spindle 10 is stopped (i.e., between points D and E in FIGS. 3A and 3B).

In step S7, the control unit 30 compares the drive current value I with the first threshold I1. If the drive current value I is smaller than the first threshold I1 (NO at step S7), the control unit 30 compares the drive current value I with the second threshold I2 (step S9). If the drive current value I is greater than the second threshold I2 (NO at step S9), the control unit 30 determines that no fault has occurred. Accordingly, the control unit 30 performs a normal-speed retracting operation for retracting the drill tap 4 from the workpiece 70 by driving the spindle motor 14 CW and the feeding motor 22 in the reverse direction (step S11).

If the drive current value I is greater than or equal to the first threshold I1 (YES in S7), the control unit 30 determines that the first-class-fault has occurred. Thus, the control unit 30 controls the display 28 to display an error signal (step S15). Then, in order to avoid damaging the workpiece 70, the control unit 30 performs a low-speed retracting operation at step S17. The low-speed retracting operation in step S17 is the same as the normal-speed retracting operation performed at step S11 except performed at a lower speed.

If the drive current value I is smaller than or equal to the second threshold I2 (YES in S9), the control unit 30 determines that the second-class-fault has occurred. In this case, since the torque is relatively small, it is not necessary to take into consideration the possibility that the workpiece is damaged. Accordingly, the control unit 30 controls the display 28 to display an error signal (step S19) and performs the normal-speed retracting operation of step S11.

As constructed above, if a fault occurs, an operator is quickly notified of the occurrence of the fault. In particular, since the torque is detected when the spindle is stopped, the torque is free from the effects of acceleration or deceleration of the spindle 10 such that faults can be detected accurately. Further, in case of the first-class-fault, the workpiece 70 is protected from being further damaged by slowly retracting the drill tap 4 therefrom.

Figure 5:
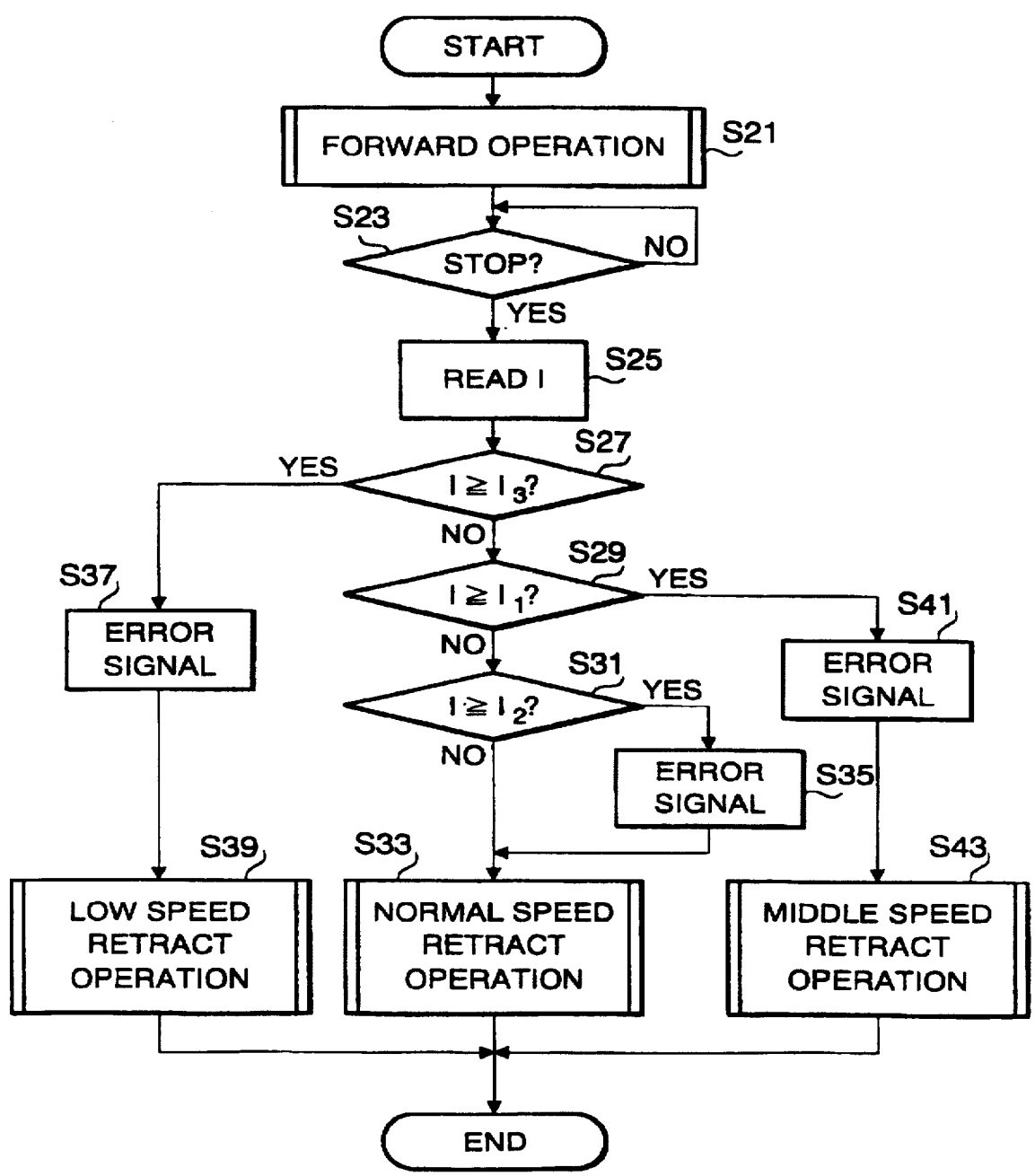
FIG. 5 is a flow chart showing an alternative control process for the machine tool of FIG. 1.

FIG. 5 shows an alternative control process for the threading machine 1. In this alternative control process, the above mentioned first-class-faults are further classified based on a severity of a fault into top-first-class and semi-first-class. The control unit 30 selects a retraction speed among three speeds according to the class of fault (top-first-class, semi-first-class or second-class). In order to discriminate the top-first-class-fault from the semi-first class-fault, the control unit 30 uses a third threshold I3 greater than the first threshold I1. The first and second thresholds I1 and I2 are defined similar to those of the process of FIG. 4.

The steps S21 to S25 are same as steps S1 to S5 of FIG. 4 described above. In step S27, the control unit 30 compares the drive current value I with the third threshold I3. If the drive current value I is greater than or equal to the third threshold I3 (YES in step S27), the control unit 30 determines that the top-first-class-fault has occurred. Thus, the control unit 30 controls the display 28 to display an error signal (step S37) and performs the above mentioned low-speed retracting operation of step S39.

If the drive current value I is smaller than the third threshold I3 (NO at step S27), the control unit 30 compares the drive current value I and the first threshold I1 (step S29). If the drive current value I is greater than or equal to the first threshold I1 (YES at step S29), the control unit 30 determines that the semi-first-class-fault has occurred. The control unit 30 then controls the display 28 to display the error signal (step S41) and performs a middle-speed retraction operation at step S43. Since the severity is relatively low, the middle-speed retraction operation is performed faster than the low-speed retraction operation of step S39.

If the drive current value I is smaller than the first threshold I1 (NO at step S29), the control process proceeds to step S31. In step S31, the control unit 30 compares the drive current value I with a second threshold I2. If the drive current value I is greater than the second threshold I2 (NO at step S31), the control unit 30 determines that no fault has occurred and performs the above-mentioned normal-speed retracting operation (step S33). If the drive current value I is smaller than or equal to the second threshold I2 (YES in step S31), the control unit 30 determines that the second-class-fault has occurred and performs the normal-speed retracting operation of S33 after displaying an error signal (step S35).

As constructed above, since the retraction speed is selected based on a severity of a fault, the manufacturing speed is improved while providing accurate fault detection and protecting the workpiece 70.

In the above-described embodiment, the drill tap 4 may be replaced by a die and the threading machine 1 may be replaced by a threading machine for machining an external thread or a cutting machine for cutting an oil groove on a bearing metal. Although the structure and operation of a machine tool with fault detection is described herein with respect to the embodiment, many other modifications can be made without departing from the spirit and scope of the invention.

The present disclosure relates to subject matter contained in Japanese Patent Application No. HEI 08-125008 filed on May. 20, 1996, which is expressly incorporated herein by reference in its entirety.

What is claimed is:

1. A machine tool comprising:
   a cutting tool;
   a spindle which holds said cutting tool;
   a drive unit arranged to drive said spindle so that said cutting tool cuts a workpiece and to drive said spindle in a reverse direction so that said cutting tool retracts from said workpiece; and
   a control unit arranged to detect a value representing a torque applied on said spindle and to compare said value with a predetermined threshold thereby to determine if a fault has occurred;
   wherein said control unit detects said value when said drive unit stops said spindle in a state that said cutting tool is acting on said workpiece with applying the torque on said spindle to keep the engagement of the cutting tool with said workpiece.

2. The machine tool according to claim 1, wherein said drive unit rotates and feeds said spindle respectively in a first rotational direction and a first feeding direction, thereby to cut said workpiece with said cutting tool.

3. The machine tool according to claim 2, wherein said drive unit rotates and feeds said spindle respectively in a second rotational direction and a second feeding direction, thereby to retract said cutting tool from said workpiece.

4. The machine tool according to claim 3, wherein said drive unit includes a rotation motor driven to rotate said spindle and a feeding motor driven to feed said spindle.

5. The machine tool according to claim 4, wherein said value representing a torque is a value of a drive current sent from said control unit to said rotation motor.

6. The machine tool according to claim 5, wherein said rotation motor is a servo-motor and said control unit further comprises a servo-amplifier, said value being a drive current from said servo-amplifier to said rotation motor.

7. The machine tool according to claim 3, wherein, if said control unit detects the occurrence of a fault, said drive unit rotates and feeds said spindle respectively in said second rotational direction and said second feeling direction at lower speeds.

8. The machine tool according to claim 1, further comprising a signal generating system which generates a signal when said control unit detects the occurrence of a fault.

9. The machine tool according to claim 1, wherein said control unit is arranged to classify faults according to said detected value.

10. The machine tool according to claim 9, wherein said control unit is arranged to select a retracting speed, based on the classification of a fault.

11. The machine tool according to claim 10, wherein faults are classified into a plurality of classes of faults including a first-class-fault and a second-class-fault, and wherein said first-class-fault is set such that the occurrence of said first-class-fault increases said torque, and wherein said second-class-fault is set such that the occurrence of said second-class-fault decreases said torque.

12. The machine tool according to claim 11, wherein said control unit has a plurality of thresholds including a first threshold and a second threshold respectively used to discriminate said first-class-fault and said second-class-fault from a state in which no fault occurs.

13. The machine tool according to claim 12, wherein said control unit determines the occurrence of said first-class-fault if said value is larger than said first threshold and determines the occurrence of said second-class-fault if said value is smaller than said second threshold.

14. The machine tool according to claim 11, wherein said first-class-fault is further classified based on said value into at least two classes.

15. The machine tool according to claim 14, said control unit having at least one additional threshold used to discriminate said at least two classes of said first-class-fault.

16. The machine tool according to claim 1, further comprising a stop detecting system which detects if said rotation is stopped.

17. The machine tool according to claim 16, wherein said stop detecting system is arranged to check if said rotation is stopped, based on detecting one of the rotation speed and the feeding speed of said spindle.

18. The machine tool according to claim 16, wherein said stop detecting system is arranged to check if said rotation is stopped, based on detecting the rotation position of said spindle.

19. The machine tool according to claim 1, wherein said cutting tool is a tap used to cut an internal thread.

20. A method for detecting a fault on a cutting tool during machining a workpiece with said cutting tool, said cutting tool being provided on a spindle, said method comprising the steps of:

rotating said spindle with a torque required to resist a reactive force from said workpiece, so that said cutting tool cuts said workpiece;

stopping said cutting tool in a state that said cutting tool is engaged with said workpiece, while keeping applying said torque on said spindle;

reading a value representing said torque applied on said cutting tool;

comparing said value with at least one predetermined threshold; and determining if a fault has occurred, based on a result of said comparing step.

21. The method according to claim 20, further comprising a step of retracting said cutting tool from said workpiece after said comparing step.

22. The method according to claim 21, wherein, if said control unit detects the occurrence of a fault, said retracting step is performed at a lower speed.

* * * * *